Aug. 23, 1960 K. BECKENBACH 2,950,019
APPARATUS FOR CHARGING KILNS
Filed Jan. 14, 1957 8 Sheets-Sheet 1

INVENTOR
KARL BECKENBACH

By: Toulmin & Toulmin
ATTORNEYS

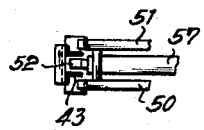
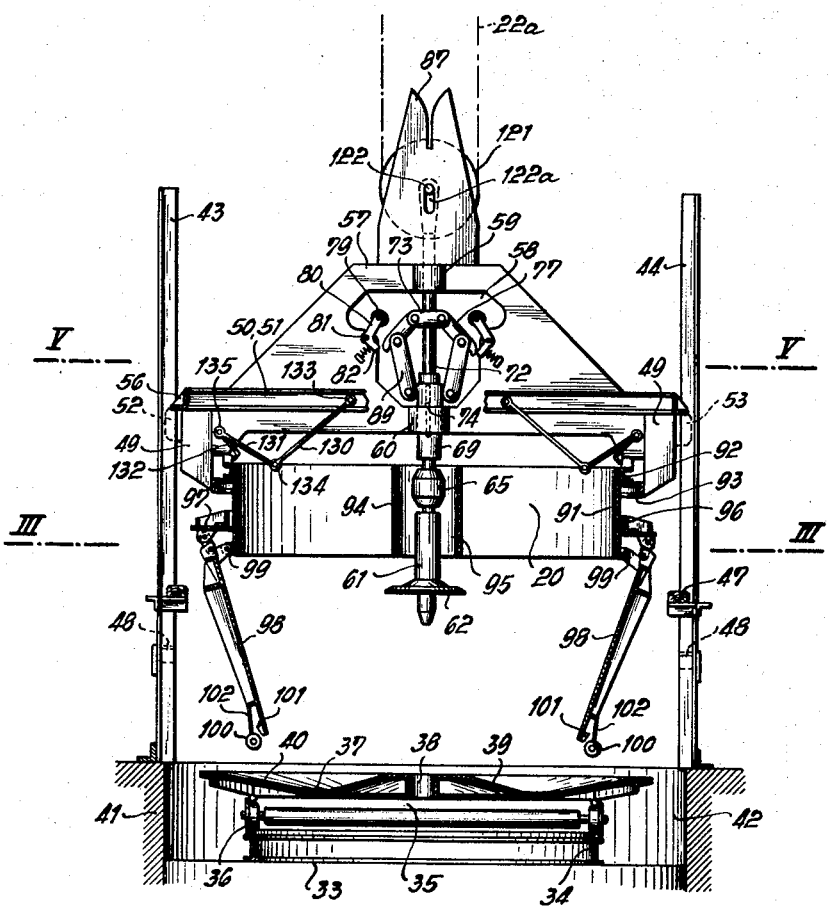

INVENTOR
KARL BECKENBACH

By: Toulmin & Toulmin
ATTORNEYS

INVENTOR
KARL BECKENBACH

By: Toulmin & Toulmin
ATTORNEYS

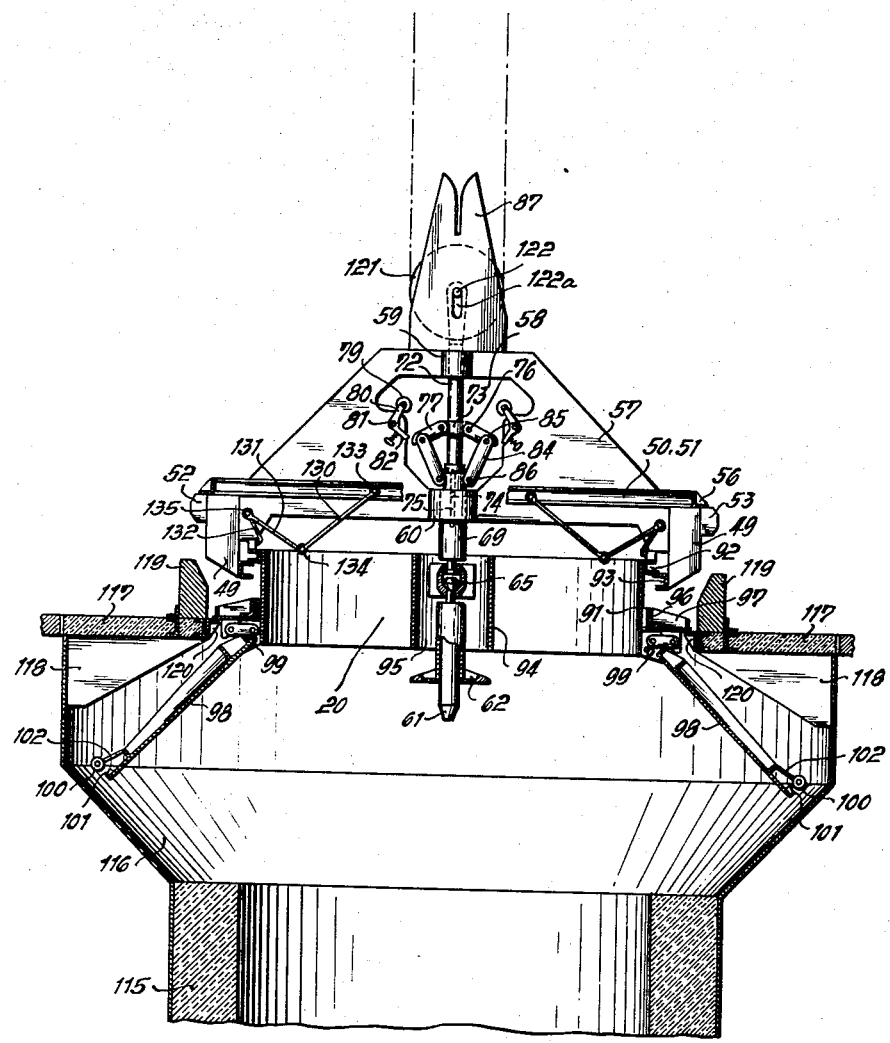

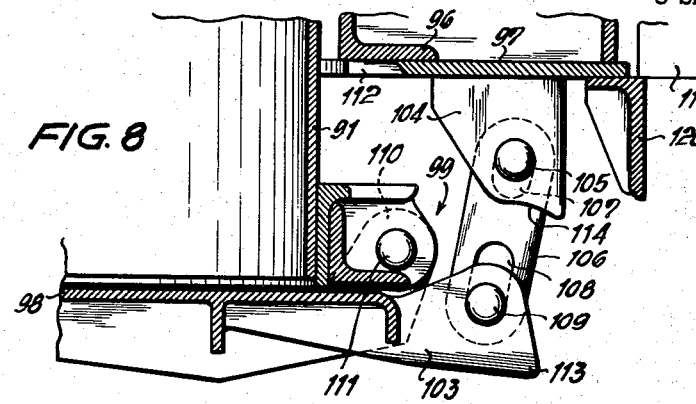
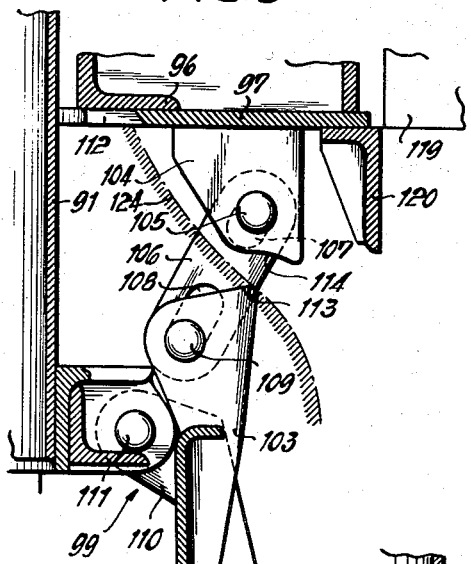
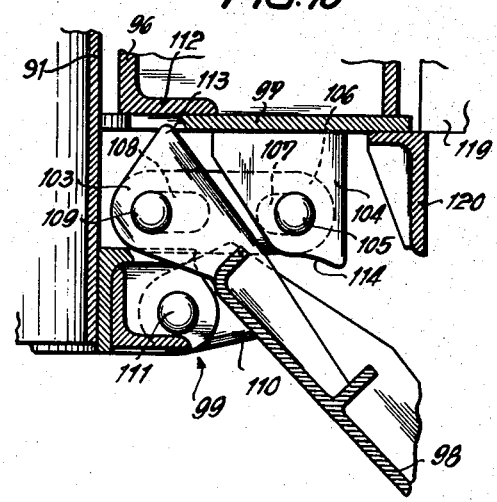
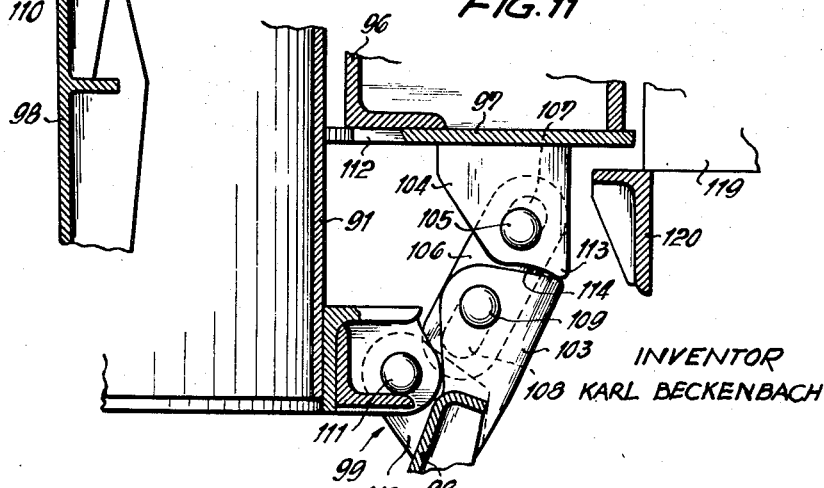

United States Patent Office 2,950,019
Patented Aug. 23, 1960

2,950,019
APPARATUS FOR CHARGING KILNS

Karl Beckenbach, 13 Am Willer, Meererbusch Buderich, Germany

Filed Jan. 14, 1957, Ser. No. 634,010

6 Claims. (Cl. 214—18)

This invention relates to an apparatus for charging kilns, and more particularly for kilns destined for roasting and calcining lime-containing materials, in which the material is charged from above while the finished products are removed at the lower part of the kiln.

This application is a continuation-in-part of my pending patent application Serial Number 151,873 filed March 25, 1950, now Patent 2,784,025 patented March 5, 1957; part of the subject matter claimed in this application is disclosed but not claimed in said patent.

It is an object of this invention to provide an apparatus for charging kilns which delivers the charge into the kiln, from a container having a determined distribution of superimposed horizontal layers of the various components required for the roasting or calcining process, which containers discharge their contents into the kiln in such a manner that the aforesaid distribution of layers is preserved in the kiln.

In known charging methods the charge is brought to the charging orifice of the kiln by means of an elevator or other conveyor means, and is delivered to the distributing apparatus which is enclosed in the upper part of the kiln, or it is loaded into buckets which are first carried to the charging orifice whereupon their contents are discharged directly into the kiln.

In the former case the distributing apparatus enclosed in the upper part of the furnace shaft is subjected to the direct attack of the fumes which because of their high temperature and chemical composition cause a rapid destruction of this apparatus.

In order to minimize as far as possible such destruction, the distributing installation and any sieves mounted therein must be of robust construction, which feature makes them less adapted to fulfill their function of distributing the charge. Another substantial drawback of having the distributing installation mounted in the upper part of the shaft is that it functions properly or reasonably well only if the components of the charge have a determined particle size, while, if there is even a slight variation in the size of the particles, the distribution is not satisfactory. It is not possible to adapt the distributing installation to fluctuations in the particle size during the charging step, since it is extremely difficult or even completely impossible to make the necessary adjustments in the distribution apparatus during the operation of the kiln.

In the second case mentioned above, i.e. when a bucket is used for charging the kiln, which is filled at ground, raised to the charging orifice and caused to deliver its contents directly into the kiln, i.e. without the aid of a distribution installation, the contents of the bucket are, unavoidably, mixed together, and the distribution of layers is destroyed.

The aforesaid object is attained and the above-mentioned drawbacks avoided by charging kilns with the aid of the apparatus according to my invention. This apparatus comprises a charging bucket of novel construction having a bottom part which is divided into a plurality of sectors. These sectors are held closed by a device which permits to open them instantaneously by a simple jerky motion. The sectors of the bottom are opened so rapidly that they swing open faster than the material contained in the bucket drops out of the latter under the effect of gravity. Thereby the entire contents of the bucket drops freely downwardly into the kiln without sliding along the sector surfaces as always happened in the case of the known constructions. Only by avoiding this sliding contact of the falling bucket contents with the opening sector surfaces it is possible to transfer the contents from the bucket into the kiln without changing their original stratification.

Another feature of my invention resides in a device for automatically closing the bottom sectors when setting the emptied bucket on a supporting frame of the bucket-filling installation. This supporting frame consists preferably in a rotatable table. The closing device can be mounted either on the rotatable table, or on the bottom sectors of the charging bucket, or may comprise parts mounted on both the supporting table and the bottom sectors of the bucket and adapted for cooperating with each other when the bucket is set on the supporting table, thereby causing the bottom sectors to close. I prefer the latter arrangements of means mounted on the supporting table and other means mounted on the bottom sectors of the bucket.

A further improvement in the apparatus according to my invention consists in a suspending device for the charging bucket which is adapted to release the bucket when the latter is set down on the rotatable supporting table of the filling installation, whereby it is possible to rotate the bucket together with the supporting table during the filling step, while the suspending device remains stationary above the bucket without impeding the rotation of the latter.

According to a main feature of my invention the bottom sectors of the fill-bucket are opened, when the bucket is set upon the top opening of the kiln, by means of an opening device which is vertically arranged in the central axis of the bucket and, in closing position, holds the bottom sectors of the bucket by centrally arranged holding elements mounted on the holding device. When the bucket comes to rest upon the kiln opening, the holding device is caused to carry out an additional axial movement in downward direction, thereby suddenly releasing the bottom sectors.

According to a further important feature of my invention the hinges by means of which the bottom sectors are mounted on the periphery of the bucket wall, are connected with an auxiliary device for accelerating the downward movement of the bottom sectors about the aforesaid hinges when the full bucket is opened. The auxiliary accelerating device is also provided with braking means for absorbing the kinetic energy of the bottom sectors accelerated as described above, thereby avoiding damage to the bucket.

In combination with the last-mentioned auxiliary device the upper part of the kiln shaft immediately adjacent and below the top opening of the kiln is widened sufficiently to permit an unimpeded outward swivelling motion of the bottom sectors.

As has been stated above the auxiliary acceleration of the bottom sectors causes the same to open faster than the material in the bucket drops out of the latter under the effect of gravity. Consequently the material drops into the kiln and preserves the same stratification which it had been given previously when filling the bucket.

The invention will be better understood as the description for the same proceeds in connection with the accompanying drawings in which:

Figure 2 shows an empty bucket according to the invention above the rotatable supporting table;

Figure 3 shows a detail of a sectional top view along line I—I in Figure 2;

Figure 7 illustrates the upper kiln opening and bucket with the latter in opened position;

Figure 8 shows an accelerating device for the bottom sectors with a sector in closed position;

Figures 9, 10 and 11 show various positions of the accelerating device and the bottom sector illustrated in Figure 8;

Figure 1:
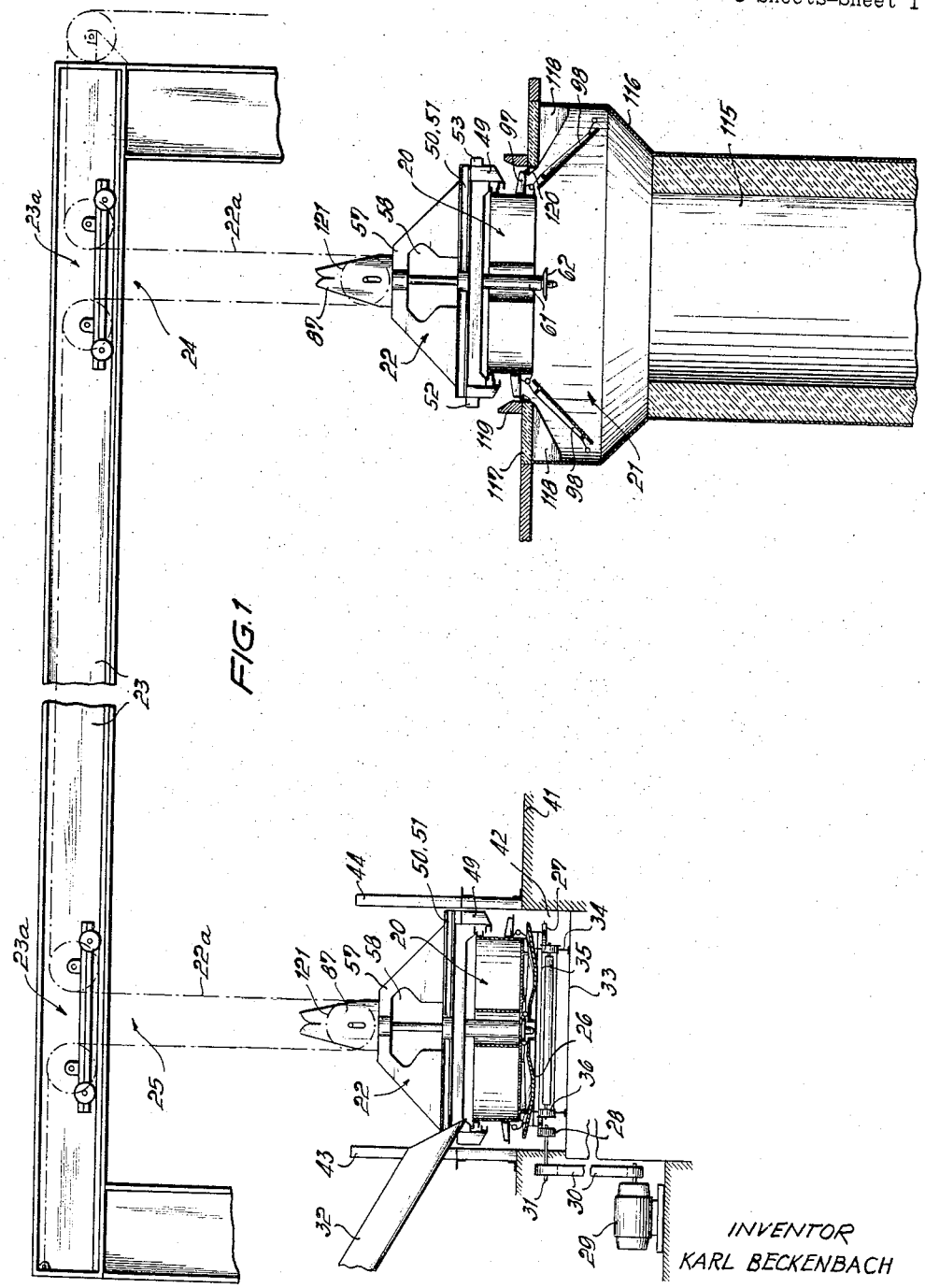
Figure 1 shows schematically an assembly of the kiln charging installation.

Referring now to the drawings more in detail and in particular to Figure 1, the bucket 20 is positioned on top of the kiln 21 and suspended from an overhead rail 23 by means of the suspending device 22. After the charge has been transferred from the bucket into the kiln, the empty bucket is transferred from the position designated with 24 by moving the suspending device 22 along the rail 23 to the position indicated at 25 above the rotatable supporting table 26 which is provided with a gear 27 and pinion 28 which is driven by means of the motor 29 through a belt transmission 30 and a shaft 31 serving for rotating table 26. After the bucket 20 has been set on the table 26 it is filled, for instance, by way of a shoot 32 with several layers of different materials required for the calcining or roasting process in kiln 21.

Figure 4:
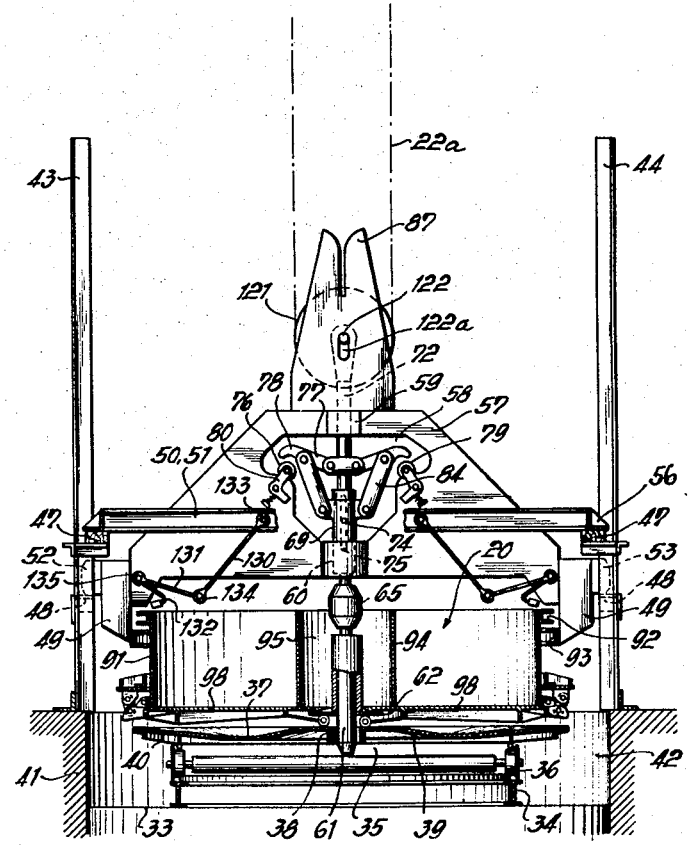
Figure 4 shows the bucket in closed position set upon the rotatable table of the filling device.
Figure 5:
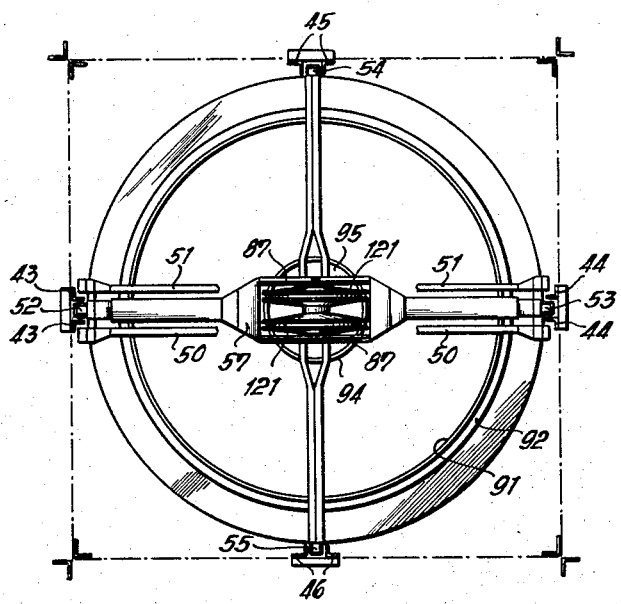
Figure 5 is a sectional top view along line II—II in Figure 2.

Figures 2, 3, 4 and 5 illustrate the filling installation and the bucket in opened position (Fig. 2) and closed position (Fig. 4). In these Figures reference numeral 33 designates the base plate of the filling installation which is surrounded by an annular race or rail 34. The rotatable table 35 is provided peripherally with a plurality of wheels 36 which run on this rail 34. Platform 37 rests with its supporting rim on those wheels 36 and is provided with a central opening 38. Furthermore platform 37 is provided with an annular recess having a centrally disposed conical surface 39, an annular bottom surface 37 and an outwardly disposed rim surface 40; surfaces 39, 37, and 40 forming together the aforesaid annular recess. On the foundation wall 41 surrounding the pit 42 in which the rotating assembly consisting of parts 34 to 40 is disposed there is mounted a framework consisting of guiding rails or struts 43, 44, 45, 46 (Fig. 5). In Figures 2 and 4 only guiding rails 43 and 44 have been illustrated for clarity's sake.

The framework of the filling installation further comprises stops 47 and 48 mounted at different levels on the struts 43, 44, 45, and 46. Between these struts the suspending device 22 for the bucket 20 is guided during upward and downward movement of the latter by means of cross bars 50 and 51 and guiding shoes 52, 53, 54, and 55 which form part of the suspending device 22 and move in grooves provided in each of the aforesaid struts.

These cross bars 50 and 51 are connected by a lever assembly comprising levers 130, 131, and 132 to the suspension head 57 forming part of the suspending device 22. One end of lever 130 is pivotally mounted at 133 on cross bars 50 and 51 respectively, and articulately joined to lever 131 at 134. The other end of the latter lever is pivotally mounted on the head 57 at 135 together with hooked lever arm 132 rigidly connected to lever 131.

The suspending device 22 further comprises a plurality of brackets 49 mounted on the head 57, which brackets have an annular support ring 93 attached thereto. Furthermore the head 57 is provided with angle plates 56 for resting on the stop 47.

Suspension head 57 of the suspending device 22 is provided with a central chamber 58 open on top by way of channel 59 and at the bottom via channel 60. In this chamber 58 there is housed the lever assembly for the bottom-opening and -closing device which comprises a vertically disposed bottom-closing rod 61 which bears at its lower end a conical enlargement or plate 62.

Figure 12:
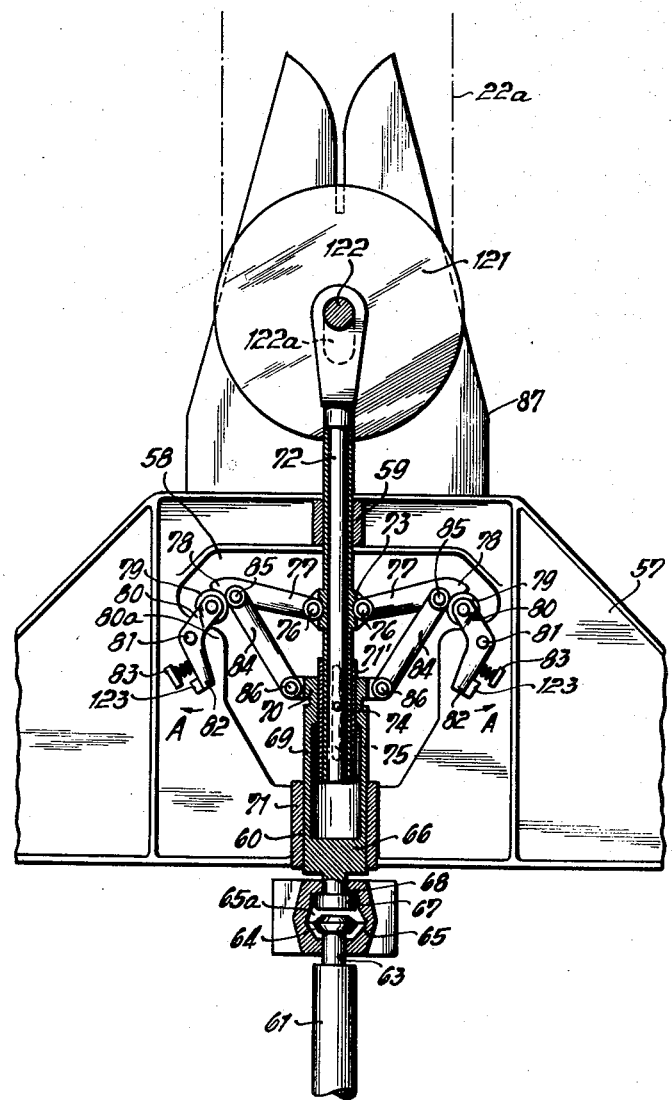
Figure 12 is a partially sectional view of the upper portion of the closing device for the charging apparatus according to the invention.

The details of this device are shown in Figure 12. At its upper end, rod 61 bears a stud 63 of reduced diameter and an enlarged collar 64. The coupling ring 65 has an internal chamber 65a and grasps in its lower end the collar 64 of rod 61, and in its upper end an enlarged collar or plate 67 of rod 66. Plate 67 is connected to rod 66 by a stud 68 of reduced diameter. The coupling ring 65 thus connects the rods 61 and 66 in such a manner that they are rotatable relative to each other, thus permitting free rotation of the bucket 20 suspended from rod 61 when closed, independently of the suspending device 22. Rod 66 is rigidly connected to the lower end of a sleeve 69, which bears at its upper end a double-joint bushing 70. The sleeve 69 is vertically displaceably guided in guide sleeve 71 mounted in the bottom of head 57.

The bushing 70 has a central passage 71' in which there is vertically displaceably mounted the tubular rod 72 which passes out of chamber 58 through guide sleeve 59 mounted in the top wall of head 57.

Rod 72 bears rigidly attached a double-joint bushing 73 in the upper part of chamber 58. Near its lower end, rod 72 is provided with a transverse pin 74 for exactly guiding the lever assembly, which transverse pin protrudes at right angles to the aforesaid lever assembly in chamber 58 and extends through a slot 75 to the outside of sleeve 71'.

Bushing 73 bears on opposite sides pivots 76 on which levers 77 are hingedly mounted. Levers 77 are adapted to rest with cam portions 78 provided at their free ends, on stop rolls 79 which are borne by one end of double-arm angular levers 80. These levers 80 are pivotally mounted about pins 81 in a projecting portion 80a of the wall of chamber 58. The sleeved arms 82 of levers 80 are provided with springs 83 connected with one end to the wall of head 57, and urging the lever arms 80 in the direction of arrows A against a stop 123. Connecting straight bar levers 84 are pivotally mounted at 85 in levers 77, and at 86 on the double-joint bushing 70.

Rod 72 is provided at its upper end, protruding from the suspension head 57, with an end piece in which shaft 122 of pulley 121 is rotatably housed transversely to rod 72.

The pulley 121 is held by chain 22a suspended from an overhead trolley 23a which runs on the guide rail 23 (Fig. 1). Shaft 122 extends with its ends into slots 122a provided in two brackets 87 which brackets are rigidly mounted on top of suspension head 57.

The bucket 20 has an outer cylindrical wall 91, at the upper end of which there is mounted a ring 92 which serves for coming to rest on ring 93 of head 57. An inner cylindrical wall 94 forms a central vertical passage 95 through the bucket 20. The bottom-closing rod 61 is freely suspended downwardly through this central passage 95 of the bucket.

The bucket 20 is further freely surrounded by a horizontally disposed circumferential ring 96 which is rigidly connected to a ringplate 97. The bottom of bucket 20 is formed by a plurality of sector-shaped plates 98 which are mounted by hinge means 99 comprising pivots 111 and arms 110 of bottom plates 98, at the lower periphery of the bucket wall 91.

Each bottom sector 98 bears at its tip directed toward the center of the bucket bottom, a guide roller 100 and a nose 101. The guide roller 100 is mounted on an arm 102 flangedly mounted in central position on the lower side of each bottom sector 98, and is destined to roll along the inwardly sloped annular surfaces 39, 40 provided on the platform 37 of the filling table, whereby the bottom of the bucket 20 is closed.

As is illustrated in Figures 8 to 11 the bottom sectors 98 are provided at their peripheral end with lever-arms 103 projecting beyond the bucket 20 and bearing pivots 111 and nose portions 113. The ringplate 97 on the other hand, bears a number of downwardly projecting stiffening plates 104 each of which corresponds to, and faces a lever arm 103 of one of the bottom sectors 98. Each plate 104 bears a pivot 105. A fishplate 106 which possesses a shorter longitudinal slot 107 housing pivot 105 of plate 104 of the ringplate 97, and a longer elongated slot 108 housing pivot 109 of the lever arm 103 of bottom sector 98, serves, together with a further lever arm 110 of the bottom sector and a pivot 111, as a link between the bucket 20 and the ringplate 97. The co-operation of the various parts pertaining to the articulated joint between ring 96 and the bottom sectors 98 will be described in greater detail further below. It is important for this co-operation that ringplate 97 is provided with recesses 112 registering with the noses 113 of the aforesaid lever arms 103, and that the stiffening plates 104 are provided with a cam portion 114.

Figure 6:
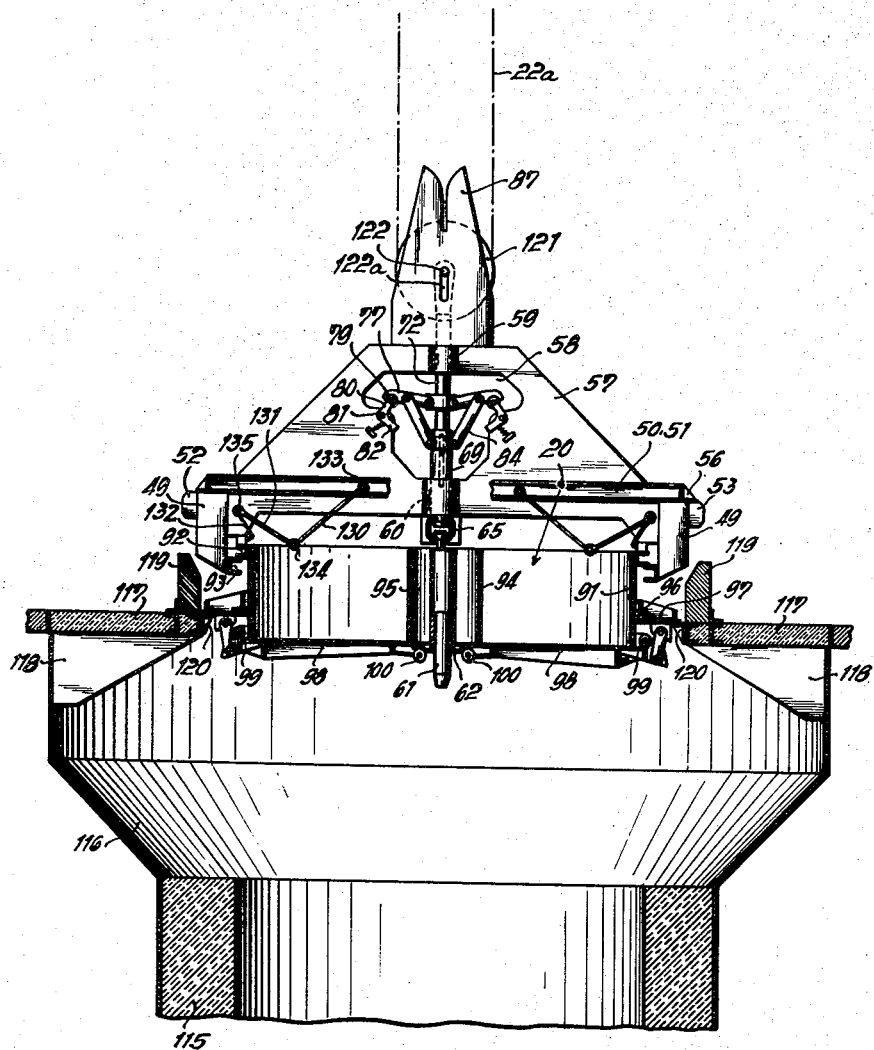
Figure 6 shows the upper kiln opening and the closed bucket at the instant of being set upon the charging opening of the kiln.

As can be seen in Figures 6 and 7, the kiln 115 is provided at the top with an enlarged chamber 116. This chamber 116 is covered by the roof 117 which is supported by prop plates 118. In the center of the roof 117 there is provided a circular opening having a circular reinforced rim 120. About this rim there are disposed guiding members 119 for receiving therein guidingly the brackets 49 of head 57 of the bucket 20. The diameter of the central opening of roof 117 is sufficiently wide to let the bucket 20 and the lever mechanism pass freely through the aforesaid opening, while the outer peripheral portion of ringplate 97 comes to rest on the reinforced rim 120 of the roof opening.

The apparatus according to the invention operates in the following manner. An empty bucket 20 with its bottom sectors 98 hanging downwardly in open position is carried by means of the overhead transporting device 23 above the filling station (left side of Fig. 1) and lowered by means of the suspending device 22 toward the platform 37 so that the guiding shoes 52, 53, 54, and 55 of the bucket suspending head 57 enter into the respective guiding rails 43, 44, 45, and 46. The head and bucket are lowered until the guiding rollers 100 of the bottom sectors 98 come into contact with the inwardly inclined beveled surface 40 of the rotary table 35. The guiding rollers 100 are guided inwardly by the surface 40 thus causing the bottom sectors 98 to carry out a closing movement which is completed by the guiding rollers moving upwardly along the central beveled surface 39 which ascends toward the center of table 35. This closing movement of the guiding rollers is so coordinated with the downward movement of the bottom closing rod 61 that the rollers 100 are guided below the conical plate 62 while, simultaneously, the noses 101 are guided into a position above the same plate 62 of the bottom closing rod 61, the lowermost end of which has entered the central recess 38 of rotary table 35 during the last stage of the downward movement of the head and bucket assembly.

Toward the end of the downward movement of the head and bucket assembly, the crossbars 50 and 51 come first to rest on stops 47, while the head 57 is still further lowered until shoes 52, 53, 54, and 55 come to rest on respective stops 48 of the guiding rails 43, 44, 45, and 46. By the movement of the head 57 downwardly away from the traverses 50 and 51, levers 130 and 131 are straightened and hooked lever 132 is moved upwardly away from the upper ring 92 of bucket 20 (Fig. 4), thereby releasing the bucket for a slight movement in upward direction during the closing movement of bottom sectors 98. The bucket 20 which was locked by means of hooked lever 132 in suspended position with its ring 92 resting on the supporting ring 93 of head 57 is now standing (Fig. 4) on rotary table 35 with its ring 92 lifted a short distance above supporting ring 93, so that the bucket 20 can be freely rotated on table 35 while the entire supporting device 22 including head 57 can remain stationary. The bucket can thus be filled while rotating, so as to obtain an even stratification of materials therein.

Furthermore, this rotary movement of the bucket 20 on table 35 free from contact with the suspending device 22 is made possible by the fact that, during the last stage of the downward movement of the bucket and head assembly, the bottom-closing rod 61 has been slightly lifted by the rollers 100 raising somewhat the conical plate 62, whereby the top collar 64 at the upper end of rod 61 is slightly lifted in the internal chamber 65a of the connecting member 65. (See Figure 12.)

During the filling operation of the bucket by means of the chute 32, the bucket is rotated on table 35 by means of motor 29, belt transmission 30, pinion 28, and ring gear 27.

The filled bucket 20 is then raised from table 35 by lifting first the suspending device 22 by means of the chain 22a. Thereby head 57 and the supporting ring 93 attached to the brackets 49 of head 57 are lifted, ring 92 of the bucket 20 comes to rest on supporting ring 93, and, simultaneously, lever 77, which is in the position shown in Figure 4, while the bucket 20 is standing on table 35, is actuated by the upward movement of rod 72 so that its nose 78 comes to rest on the cam roller 79 in the position illustrated in Figures 6, 12, and 13. In the position illustrated in Figure 13 lever 77, which is pulled upwardly, exerts pressure with its nose 78 on cam roller 79 in the direction of the line of force indicated by a dash and dotted line $K_1$. Thereby the cam lever 80 is caused to press with its free arm 82 against the stop 123, thereby compressing spring 83. The upward pull of sleeve 72 and the downward pull of sleeve 69 thus counteract on pivot 85 and the bottom-closing rod 61 connected to sleeve 69 is held in closed position by lever 80 withstanding the downwardly directed force $K_1$ by resting on stop 123.

Simultaneously, while the bucket and head assembly is raised, levers 130, 131, and 132 are shifted from the position shown in Figure 4 to that of Figure 2 and lever 132 locks the bucket on the supporting ring 93.

The filled and raised bucket 20 and the suspending device 22 are then transferred, by means of transporting device 23 from position 25 above the filling station to position 24 above the kiln. The head and bucket assembly is lowered downwardly into the position shown in Figure 6 with the entire bucket bottom-closing device in the position illustrated in Figure 12, with the exception that collar 64 of bottom-closing rod 61 rests on the bottom of the internal chamber 65a of connecting sleeve 65.

In the position shown in Figure 6, ringplate 97 of the bucket comes to rest on the reinforced rim plate 120 of the kiln roof 117. The opening and discharge operation of the bucket, which now begins, is illustrated with the aid of Figures 6, 7, 13, and 14.

When bucket ringplate 97 comes to rest on rim 120 of the kiln roof 117, the winch 23a is caused to further lower chain 22a and together therewith pulleys 121 and shaft 122 thereof. Simultaneously, rod 72 follows a short downward movement relative to head 57 and bucket 20, the latter two remaining interlocked by means of locking lever 132 during the entire discharge step.

Figure 13:
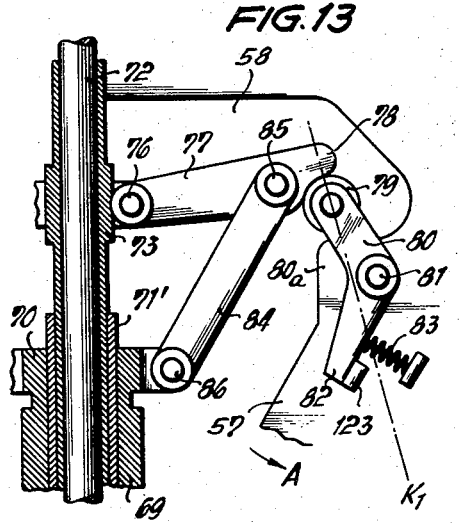
Figure 13 shows part of the lever assembly of the closing device in a slightly enlarged scale.
Figure 14:
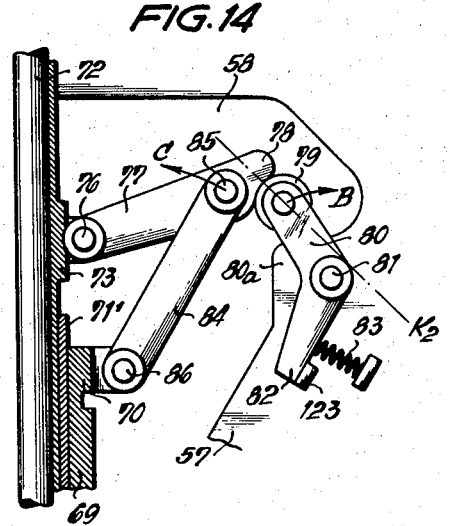
Figure 14 illustrates the same part of the lever assembly in a different position.

This downward movement of sleeve 72 causes a displacement of all parts contained in chamber 58 from the position of these parts as illustrated in Figure 13 through the position thereof shown in Figure 14 to an ultimate position as illustrated in Figure 7.

Figure 14 illustrates that during the short downward movement of sleeve 72 lever 77 swings inwardly as indicated by arrow C, the upper end of lever 84 follows this movement, and the force exercised on cam roller 79 is now shifted from the direction designated as $K_1$ to that designated as $K_2$. Thereby angular lever 80 is turned away from stop 123 against the action of spring 83, and permits levers 77 and 84 to drop to the position shown in Figure 7. Thereby sleeve 69 and bottom-closing rod 61 are permitted to carry out a sudden downward movement which is faster than the slow lowering movement of chain 22a and sleeve 72, enlarging the distance between pivots 76 and 86 from that of Figure 14 to that of Figure 7. Thereby, the bottom sectors 98 are suddenly released. This release of the bottom sectors now releases the locking mechanism which holds bucket 20 and ringplate 97 in the relative positions shown in Figure 6. The ensuing actuation of the lever mechanism connecting bucket 20 and ringplate 97 shall be explained in detail with the aid of Figures 8–11.

When bottom-closing rod 61 is lowered, noses 101 of the bottom sectors 98 slide downwardly on the conical plate 62, and the bottom sectors swing downwardly about their pivots 111. This causes a lever action between pivots 111 and 105 (see Fig. 8) having a lever momentum M=bucket weight times distance (111—105). This momentum accelerates the opening movement of the bottom sectors beyond the opening speed which they would adopt due to gravity. While, therefore, the bucket, upon release from its locked position as shown in Figure 8, moves a short way further downwardly due to further lowering of chain 22a and the entire head and bucket assembly, to the position shown in Figure 9, the bottom sectors 98 carry out this accelerated opening movement, faster than gravity, while the contents of the bucket 20 drop out only with the acceleration caused by the forces of gravity. The accelerating energy of the opening bottom sectors corresponds to the energy released by the further lowering of the bucket, i.e. it is equal to bucket weight times lowering distance of the bucket.

In Figure 9, the bottom sectors 98 have reached a position in which the bucket contents may drop out freely without any interference from the sectors. The bucket 20 has reached its lowermost position in the kiln opening. During the entire lowering stage from Figure 8 to Figure 9 nose 113 of arm 103 of each bottom sector 98 describes a curve as designated by the dash-and-dotted line 124 in Figure 9. However, the movement of the bottom sectors 98 does not terminate in the position shown in Figure 9. Due to their kinetic energy the swiveling movement of the bottom sectors continues outwardly until they reach the position illustrated in Figure 10. In this end position, the kinetic energy of the bottom sectors has caused a short upward movement of the entire bucket by comparison with the position of the bucket in Figure 9. The energy of the bottom sectors is thus spent in raising the bucket and the bottom sectors are efficiently braked. The bottom sectors remain in wide open position by nose 113 coming to rest against the projection 104 of ringplate 97 (Fig. 10).

When the bucket is empty, the entire bucket and head assembly is raised upwardly by the winch 23a, and the weight of the bottom sectors causes a short lifting movement of ringplate 97 until nose 113 comes to rest against the lower end of stiffening plate 104 in which position the bottom sector is held by the weight of ringplate 97. In this position with its bottom open, bucket 20 is re-transferred from station 24 to station 25, and again lowered to the filling platform 37.

I claim:

1. In a system for charging a kiln for firing and calcining lime-containing materials and the like, which kiln has a top opening for charging the said material, while the removal of the finished product is effected at the lower part of the kiln, and in which system the charge is transferred from a filling station comprising a rotatable filling table, by means of a charge container having an upper open end and a flat bottom formed by a plurality of sector-shaped members which are hingedly mounted on the bottom periphery of said container, said system further comprising transport means for raising, lowering, as well as laterally transferring said container; the improvement of an opening and closing device associated with said container and adapted for automatically opening the bottom members of the latter, when the container is lowered into the aforesaid kiln opening and arrested in the same, and automatically locking these bottom members in closed position, said opening and closing device comprising, in combination (1) locking means extending vertically and centrally through said container and having a top end and a bottom end; (2) holding means provided at said bottom end of said locking means and adapted for holding the tips of said bottom members in closed position; and (3) suspension means (a) disposed above and releasably engaging said container, (b) suspended from said transport means, and (c) enclosing and being articulatedly connected to said top end of said locking means in a manner permitting free rotation of said container relative to said locking means and about the vertical axis of said container, as well as permitting a limited displacement of said locking means relative to said suspension means in the direction of said vertical axis between an upper and a lower end position, said suspension means being adapted for fixedly, while said suspension means remains stationary, engaging the top end of said locking means in said upper end position of the latter, thereby causing said holding means to engage the free tips of said sector-shaped bottom members and hold the latter closed when a pull is exerted by said transport means on said suspension means in upward direction, and releasing the top end of said locking means when said container comes to rest in said kiln opening and the pull of the still lowered transport means on said suspension means ceases, so that said locking means moves downwardly to its lower end portion, whereby said holding means release said bottom members.

2. The improvement described in claim 1, further comprising (4) guiding means mounted on said table for guiding said bottom members into closed position, while said container is being lowered into position on said table, and a central recess in said table for freely receiving therein said lower end of said locking means and said holding means associated therewith.

3. The improvement described in claim 1, further comprising stationary vertical guide rails provided about said filling table, stop means rigidly mounted on said guide rails, rim means provided at the upper end of said charge container, said suspension means comprising a suspension head, supporting ring means rigidly connected to said suspension head and adapted for supportingly engaging said rim means of said container, horizontally extending cross bar means associated with said suspension head and adapted for upward and downward guidance in said vertical guide rails, container rim locking means mounted on said suspension head; and articulated lever means connecting said cross bar means with said suspension head in such a manner that said rim means of said container and said supporting ring means are firmly locked together, when said container is being transferred and is set on said kiln top opening, while said rim means and said supporting ring means are unlocked and said container becomes freely rotatable relative to said supporting head, when said cross bar means come to rest on said stop means during downward movement along said guide rails.

4. The improvement described in claim 1, wherein said locking means comprise rod means extending vertically through said suspension means, and suspended with their upper end from said transport means, sleeve means associated with said rod means and adapted for limited downward and upward movement relative to said rod means and relative to said suspension means, and connected with their lower end to said holding means, pivotable roller means mounted for swivel movement on said suspension means, first lever means articulatedly connected to said rod means and second lever means articulatedly connected with their one end to said sleeve means and with their other end to said first lever means, and spring means associated with said roller means to urge the latter into contact with said first lever means, so that said first lever means come to rest on said roller means when said rod means are pulled upwardly by said transport means raising said container, thereby holding said holding means in a position engaging said tips of said bottom members, while said first lever means upon downward movement of said rod means relative to said suspension means will urge, as pull from said transport means on said rod means ceases, said pivotable roller means outwardly and become disengaged from the latter and permit said sleeve means together with said second lever means to move downwardly and to actuate said holding means so as to release the tips of said bottom members of said container.

5. In a system for charging a kiln for firing and calcining lime-containing materials and the like, which kiln has a top opening of a given diameter for charging the said material, while the removal of the finished product is effected at the lower part of the kiln, and in which system the charge is transferred from a filling station comprising a rotatable filling table, by means of a charge container of smaller diameter than said kiln top opening and having an upper open end and a flat bottom formed by a plurality of sector-shaped members which are hingedly mounted on the bottom periphery of said container, said system further comprising transport means for raising, lowering, as well as laterally transferring said container; the improvement of an opening and closing device associated with said container and adapted for automatically opening the bottom members of the latter, when the container is lowered into the aforesaid kiln opening and arrested in the same, and automatically locking these bottom members in closed position, said opening and closing device comprising, in combination, (1) locking means extending vertically and centrally through said container and having a top end and a bottom end; (2) holding means provided at said bottom end of said locking means and adapted for holding the tips of said bottom members in closed position; (3) suspension means (a) disposed above and releasably engaging said container, (b) suspended from said transport means, and (c) enclosing and being articulatedly connected to said top end of said locking means in a manner permitting free rotation of said container relative to said locking means and about the vertical axis of said container, as well as permitting a limited displacement of said locking means relative to said suspension means in the direction of said vertical axis between an upper and a lower end position; (4) ring means surrounding said container and having a total diameter greater than said kiln opening; and (5) link means articulatedly connecting said bottom members in the vicinity of where the latter are hinged to the periphery of said container, to said ring means, in such a manner as to first accelerate, and then brake a downward and outward opening movement of said bottom members; said suspension means being adapted for fixedly engaging the top end of said locking means in said upper end position of the latter, while said suspending means remain stationary thereby causing said holding means to engage the free tips of said sector-shaped bottom members and hold the latter closed when a pull is exerted by said transport means on said suspension means in upward direction, and releasing the top end of said locking means when said container comes to rest in said kiln opening and the pull of the still lowered transport means on said suspension means ceases, so that said locking means moves downwardly to its lower end position, whereby said holding means release said bottom members.

6. In a system for charging a kiln for firing and calcining lime-containing materials and the like, which kiln has a top opening of a given diameter for charging the said material, while the removal of the finished product is effected at the lower part of the kiln, and in which system the charge is transferred from a filling station comprising a rotatable filling table, by means of a charge container of smaller diameter than said kiln top opening and having an upper open end and a flat bottom formed by a plurality of sector-shaped members which are hingedly mounted on the bottom periphery of said container, said system further comprising transport means for raising, lowering, as well as laterally transferring said container; the improvement of an opening and closing device associated with said container and adapted for automatically opening the bottom members of the latter, when the container is lowered into the aforesaid kiln opening and arrested in the same, and automatically locking these bottom members in closed position, said opening and closing device comprising in combination, (1) locking means extending vertically and centrally through said container and having a top end and a bottom end; (2) holding means provided at said bottom end of said locking means and adapted for holding the tips of said bottom members in closed position; (3) suspension means (a) disposed above and releasably engaging said container, (b) suspended from said transport means, and (c) enclosing and being articulatedly connected to said top end of said locking means in a manner permitting free rotation of said container relative to said locking means and about the vertical axis of said container, as well as permitting a limited displacement of said locking means relative to said suspension means in the direction of said vertical axis between an upper and a lower end position; (4) ring means surrounding said container and having a total diameter greater than said kiln opening; and (5) link means articulatedly connecting said bottom members in the vicinity of where the latter are hinged to the periphery of said container, to said ring means, said suspension means being adapted for fixedly engaging the top end of said locking means in said upper end position of the latter, while said suspension means remain stationary thereby causing said holding means at the lower end of said closing means to engage the free tips of said sector-shaped bottom members and hold the latter closed when a pull is exerted by said transport means on said suspension means in upward direction, and releasing the top end of said locking means when said ring means come to rest on the periphery of said kiln opening, and the container comes momentarily to a halt, so that the pull of said transport means on said suspension means ceases, whereupon said locking means moves downwardly to its aforesaid lower end position and actuates said holding means to release said bottom members, while said container moves further downwardly a limited distance through the now stationary ring means, thereby actuating said link means during the first part of the downward movement of the container relative to said ring means in such a manner as to fling said bottom members downwardly, and with their central tips outwardly, at a speed greater than that of the freely falling material being discharged from said container into said kiln, and, during the second part of the downward movement of the container relative to said ring means, in such a manner as to brake the outward swivel of said bottom members and return the same to an intermediary open position.

References Cited in the file of this patent

UNITED STATES PATENTS

| | | |
|---|---|---|
| 2,350,611 | Hicks | June 6, 1944 |
| 2,626,828 | Morgan | Jan. 27, 1953 |
| 2,784,025 | Beckenbach | Mar. 5, 1957 |

FOREIGN PATENTS

| | | |
|---|---|---|
| 622,757 | Germany | Dec. 5, 1935 |